Nov. 16, 1954  J. L. MARTIN  2,694,461
APPARATUS FOR ACOUSTIC LOGGING
Filed Nov. 12, 1949  2 Sheets-Sheet 1

ATTEST
Melvin C. Flint

INVENTOR.
John L. Martin
BY Norbert E. Birch
Attorney

United States Patent Office 2,694,461
Patented Nov. 16, 1954

2,694,461

APPARATUS FOR ACOUSTIC LOGGING

John L. Martin, Dallas, Tex., assignor to The Atlantic Refining Company, Philadelphia, Pa., a corporation of Pennsylvania Application November 12, 1949, Serial No. 126,789

3 Claims. (Cl. 181—0.5)

This invention relates to a method and apparatus for investigating the acoustic properties of subterranean formations traversed by a bore hole and more particularly to the determination of the velocity characteristic of such subterranean formations.

In the investigation of areas for subsurface structures indicative of the presence of petroleum in subsurface formations, there is commonly employed the well known method of surface seismic exploration. This method involving the detonation of an explosive charge at one point on the surface of the earth and reception of reflected or refracted energy at a second point spaced a given distance from the one point provides information as to the depth of the various subsurface strata. Based on such information obtained at several points in an area to be investigated a prediction can be made of the presence of subsurface structure favorable to petroleum deposits.

Although seismic exploration methods have been extensively employed for many years the interpretation of the records obtained thereby is quite difficult and frequently favorable structures are overlooked. The desirability of developing a method of obtaining information as to the velocity characteristic of subsurface formations for correlation with the conventional seismic record has been recognized in the industry. By "velocity characteristic," as used herein, is meant the velocity of acoustic or seismic energy through a given material. Heretofore, various methods for obtaining this velocity information have been proposed but none of them have been entirely satisfactory for various reasons. Many of these methods involve the generation of acoustic energy at one point in a bore hole traversing the formations to be investigated and determination of the time required for the energy to travel through the formation or formations between the generating point and another point in the bore hole spaced a given distance therefrom. Such methods are not entirely satisfactory because of the difficulties encountered in accurately determining the travel time of the acoustic energy through the subterranean formations. Moreover, during the making of the determinations of the time required for energy to travel through the formation it is necessary that the apparatus in the well be brought to a complete stop and, therefore, a continuous log of the bore hole cannot be obtained.

Accordingly, it is one object of the present invention to provide an improved method and apparatus for determination of the velocity characteristic of subsurface formations and which will obviate the above difficulties.

Another object is to provide such a method and apparatus whereby a continuous log may be obtained of the velocity characteristic of the bore hole.

Another object is to provide such a method and apparatus wherein the amount of acoustic energy reflected by a subsurface formation surrounding the bore hole is determined to provide an indication of the velocity characteristic of such formation.

Other objects and features of the present invention will be apparent from the description and drawings which follow.

Broadly, this invention involves generating acoustic energy at one point in a bore hole, receiving acoustic energy so generated and reflected from the wall of the bore hole at another point in the bore hole spaced from the one point, and determining the amplitude of the reflected energy. An acoustic log of the bore hole may be obtained for correlation with conventional seismic records by recording as a function of depth the amplitude of reflected energy from location to location along the entire length of the bore hole, determined in this manner.

When seismic energy traveling through a first homogeneous medium contacts a second homogeneous medium, a portion of the energy will pass into the second medium and the remainder will be reflected off the surface of the second medium in accordance with well known laws of physics. The amount of energy reflected is proportional to the ratio of velocity of seismic energy through the first medium to the velocity of such energy through the second medium.

Since the fluid in a bore hole usually is substantially homogeneous, it will be readily seen that variations in the amplitude of reflected energy from location to location in the bore hole determined in accordance with this invention and above described briefly will be indicative of variations in the velocity characteristic of the subterranean formations surrounding the bore hole.

Figure 1:
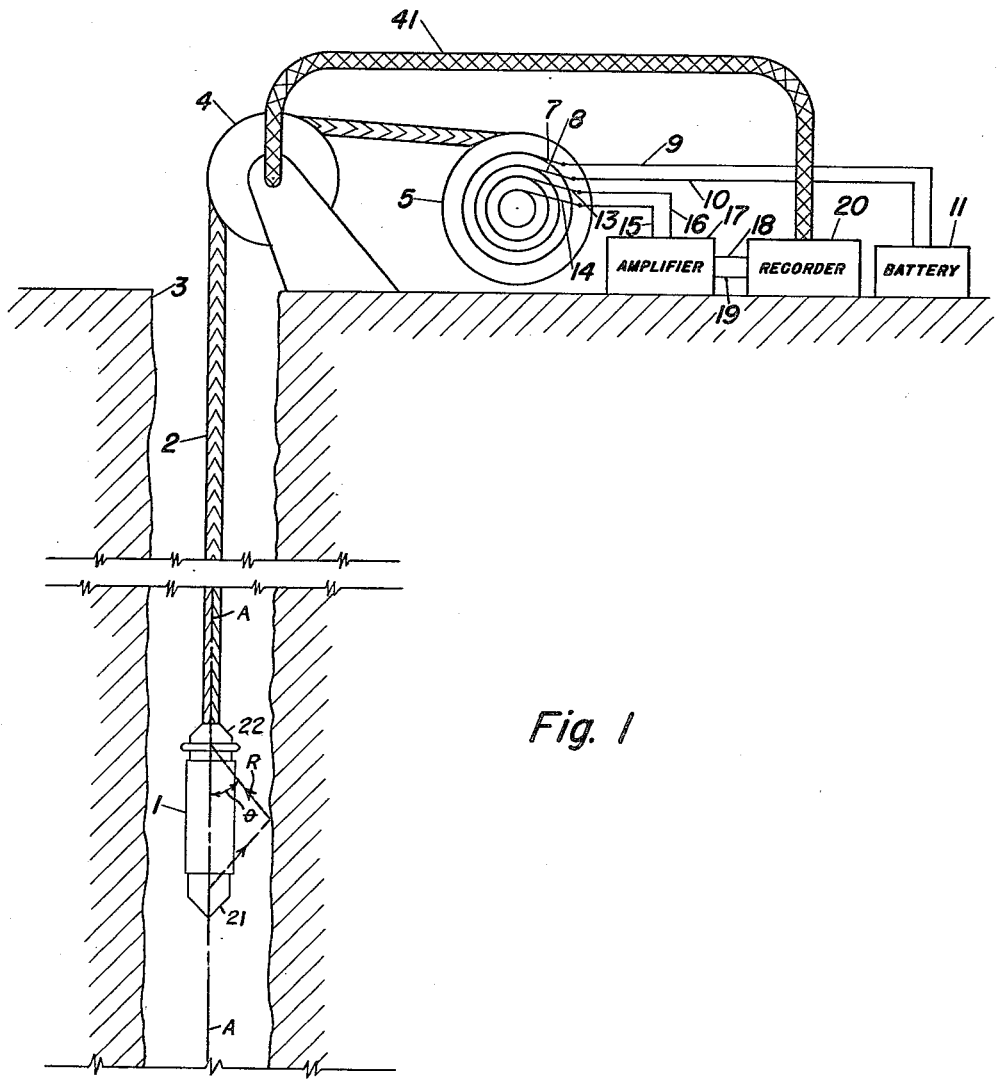
Figure 1 is a diagrammatic view of the complete system for carrying out the method of this invention.

Referring to the drawings, and particularly at this time to Figure 1, apparatus, constructed in accordance with this invention, is shown as adapted to provide an acoustic log of an uncased bore hole. An elongated well member 1, including an acoustic generator and pickup described in detail below, is connected to one end of insulated, multi-conductor cable 2 whereby well member 1 may be moved along the entire length of a bore hole, generally denoted by numeral 3, traversing the subterranean formations to be investigated. Cable 2 passes over measuring wheel 4 located on the surface of the earth adjacent the mouth of bore hole 3 and is wound on a suitable reel 5 which may be operated mechanically or manually, as desired.

One pair of conductors 6 (Figure 2) of cable 2 is connected through brush contacts 7 and 8 and wires 9 and 10 to a power source 11 for supplying power to operate the acoustic generator in well member 1. Another pair of conductors 12 (Figure 2) of cable 2 is connected through brush contacts 13 and 14 and wires 15 and 16 to a conventional amplifier 17 for amplifying electrical signals produced by the acoustic pickup of well member 1 in response to received acoustic energy. The output circuit of amplifier 17 is directly connected by wires 18 and 19 to a recording vacuum tube voltmeter 20 wherein the amplitude of the electrical signals is measured and recorded as a function of the depth of well member 1 in the bore hole. For this purpose measuring wheel 4 is operatively connected with recording vacuum tube voltmeter 20 through mechanical linkage 41 in accordance with well known practice. Although it is preferable to employ a recording vacuum tube voltmeter for measuring and recording electrical signals produced in the output of amplifier 17, there may be employed for this purpose any conventional device for measuring the amplitude of such signals and any conventional recorder adapted to operate with the selected measuring device to record continuously measured values.

Figure 2:
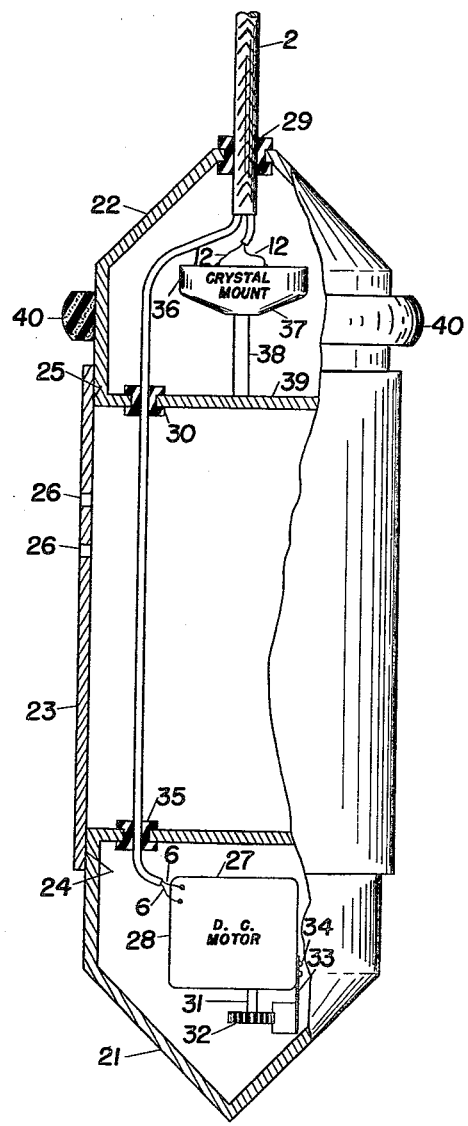
Figure 2 is an enlarged elevational view, partly in section, of the well member adapted to be lowered and raised in the bore hole.

Referring now to Figure 2, well member 1 consists of an acoustic generator housing 21 and an acoustic pickup housing 22 maintained by adjustment of the lengths of pairs of conductors 6 and 12 in spaced relationship and mechanically connected through cylindrical connector 23 formed of rubber or other resilient material, each of the housings 21 and 22 preferably being water-tight and made of a material such, for example, as a synthetic resin having a velocity characteristic approximating that of water so as to obtain good acoustic energy transmission from the bore hole liquid to the housing. However, other materials, such as stainless steel, may be employed if desired without departing from the scope of the invention. Rubber connector 23 is adapted to fit snugly about the end of generator housing 21 and pickup housing 22 as at 24 and 25, respectively, and is so maintained either by friction or by an adhesive material applied between the contacting surfaces. In the wall of connector 23 is formed a series of ports 26 permitting free flow of liquid into and out of the connector to equalize the pressure between the interior and exterior thereof.

Within generator housing 21, which is provided with a downwardly tapering lower end to reduce resistance to movement of well member 1 in the bore hole, is mounted by any suitable means, not shown, a device 27 for generating continuously acoustic waves or energy of substantially constant frequency and amplitude. In Figure 2 there is shown an acoustic generator 27 which has been found satisfactory and which comprises a direct current motor 28 to which power is supplied, as hereinbefore pointed out, from power source 11, consisting in this case of a bank of batteries, by a pair of conductors 6 of cable 2 which extends into pickup housing 22 through rubber gasket 29 provided, as shown, in the upwardly tapering end of housing 22. The pair of conductors 6 extends out of housing 22 through rubber gasket 30 and into housing 21 through rubber gasket 35, wherein the conductors are electrically connected to motor 28. Gaskets 30 and 35 are provided to maintain housings 22 and 21, respectively, in water-tight condition. On motor shaft 31 is fitted a toothed wheel or gear 32. A leaf spring 33 is secured by screws 34 to motor 28 housing in a manner such that spring 33 is deflected by the gear teeth as gear 32 rotates. It will be seen that acoustic waves or energy will be generated as spring 33 successively strikes each of the gear teeth. Although for purposes of illustration only one leaf spring is shown, two or more may be employed if desired. The frequency of the generated acoustic energy covers a relatively wide frequency band, but the dominant frequency is determined by speed at which gear 32 rotates and the number of teeth formed thereon. The dominant frequency preferably is of the order of 1,000 cycles per second. In order to secure good transfer of the generated energy to the bore hole housing 21 is filled with naptha or other suitable liquid.

Within pickup housing 22, there is mounted a device 36 for picking up or receiving acoustic energy. Although any conventional receiver adapted to pick up acoustic energy may be employed, it is preferred to utilize a piezoelectric crystal type of pickup. The crystal, not shown, is enclosed in a suitable housing 37 mounted on the free end of upright support 38 secured by cementing or other means at its other end to wall 39 of pickup housing 22. As is well known, acoustic waves acting on the piezoelectric crystal cause deformation thereof resulting in the generation of electrical signals of similar wave form and of an amplitude proportional to the acoustic waves. The electrical signals, as described hereinbefore, are passed by means of a pair of conductors 12 of cable 2 electrically connected to the crystal, into amplifier 17 wherein they are amplified before passing into recording vacuum tube voltmeter 20 for measurement of the amplitude thereof and recordation of the measured values. To obtain good transmission of acoustic energy between the bore hole liquid and pickup 36, housing 22 may be filled with naptha or other liquid as is housing 21.

The generated acoustic energy travels radially in all directions from generator 27. This energy has three possible paths by which it might reach pickup 36, namely, directly through the bore hole liquid, by reflection off the formation surrounding the bore hole, or by refraction through such formation. Since, as pointed out hereinbefore, the velocity characteristic of a subterranean formation may be ascertained in accordance with the present invention by determination of the amount of this acoustic energy reflected off the formation, it is necessary that the acoustic energy traveling by direct path through the bore hole liquid and by refraction through the formation be excluded from pickup 36 in the event that such energy interferes with the determination of the amount of reflected energy.

Since the bore hole liquid is substantially uniform throughout, the acoustic energy traveling directly between generator 27 and pickup 36 will remain constant regardless of the position of well member 1 in the bore hole and, therefore, such energy need not be eliminated but may be corrected for in the interpretation of the acoustic log. Rubber connector 23, however, functions to dampen this energy traveling directly through the bore hole liquid to the pickup thereby reducing the amplitude of such energy. It is necessary, however, to exclude the refracted energy from pickup 36. This is accomplished by spacing housings 21 and 22 a distance small enough so that the acute angle formed between the axis A of the bore hole and the path P of the received energy, such as shown in Figure 1 at θ, is greater than the angle whose sine is the ratio of the velocity of the energy in the bore hole liquid to the lowest velocity of the energy that is at least greater than the velocity of the energy in the bore hole liquid and that can be expected to be encountered in the formations surrounding the bore hole. Under such conditions all of the energy received by pickup 36 and not traveling directly through the bore hole liquid will be reflected from the formation to the exclusion of refracted energy.

One or more sponge rubber bumpers 40 may be provided externally about housing 22, as shown, to minimize the generation of spurious electrical signals in the output of pickup 36 due to contact of well member 1 with the bore hole wall.

In operation, after the apparatus has been assembled, as shown in Figure 1, well member 1 is lowered into the bore hole while acoustic energy of substantially constant frequency and amplitude is being continuously generated by generator 27. As well member 1 is continuously moved along the bore hole, the energy reflected off the various formations is determined in the manner described hereinbefore and a record made thereof by means of recording vacuum tube voltmeter 20. The acoustic log thus obtained is a plot of the velocity characteristic of the formations surrounding the bore hole.

While in the foregoing there has been shown and described the preferred embodiment of this invention, it is to be understood that minor changes in the details of construction, combination, and arrangement of parts may be resorted to without departing from the spirit and scope of the invention as claimed.

I claim:

1. Apparatus for determining the velocity characteristics of subterranean formations traversed by a substantially vertical bore hole formed in the earth comprising means for emitting continuously acoustic energy of substantially constant amplitude at one point in the bore hole, pickup means positioned a fixed distance vertically of the emitting means for receiving acoustic energy so emitted, said fixed distance being such that the acute angle formed between the axis of the borehole and the path of received energy is greater than the angle whose sine is the ratio of the velocity of the acoustic energy in the bore hole to the lowest velocity of the acoustic energy that is at least greater than the velocity of the acoustic energy in the bore hole and that is to be encountered in the wall of the bore hole whereby the received acoustic energy comprises energy reflected from the wall of the bore hole to the exclusion of energy refracted through the wall of the bore hole, and means for determining the amplitude of the received energy.

2. Apparatus for determining the velocity characteristics of subterranean formations traversed by a substantially vertical bore hole formed in the earth comprising means for emitting continuously acoustic energy of substantially constant amplitude at one point in the bore hole, pickup means positioned a fixed distance vertically of the emitting means for receiving acoustic energy so emitted, said fixed distance being such that the acute angle formed between the axis of the bore hole and the path of received energy is greater than the angle whose sine is the ratio of the velocity of the acoustic energy in the bore hole to the lowest velocity of the acoustic energy that is at least greater than the velocity of the acoustic energy in the bore hole and that is to be encountered in the wall of the bore hole whereby the received acoustic energy comprises energy reflected from the wall of the bore hole to the exclusion of energy refracted through the wall of the bore hole, means for determining the amplitude of the received energy, and means for moving the emitting means and the pickup means as a unit the vertical length of the bore hole.

3. Apparatus for determining the velocity characteristics of subterranean formations traversed by a substantially vertical bore hole formed in the earth comprising means for emitting continuously acoustic energy of substantially constant amplitude at one point in the bore hole, pickup means positioned a fixed distance vertically of the emitting means for receiving acoustic energy so emitted, said fixed distance being such that the acute angle formed between the axis of the bore hole and the path of received energy is greater than the angle whose sine is the ratio of the velocity of the acoustic energy in the bore hole to the lowest velocity of the acoustic energy that is at least greater than the velocity of the acoustic energy in the bore hole and that is to be encountered in the wall of the bore hole whereby the received acoustic energy comprises energy reflected from the wall of the bore hole to the exclusion of energy refracted through the wall of the bore hole, means for determining the amplitude of the received energy, and means for moving the emitting means and the pickup means as a unit the vertical length of the bore hole, the pickup means comprising a piezoelectric crystal.

References Cited in the file of this patent

UNITED STATES PATENTS

| Number | Name | Date |
|---|---|---|
| 2,191,119 | Schlumberger | Feb. 20, 1940 |
| 2,191,120 | Slichter | Feb. 20, 1940 |
| 2,200,476 | Mounce | May 14, 1940 |
| 2,231,243 | Beers | Feb. 11, 1941 |
| 2,233,992 | Wyckoff | Mar. 4, 1941 |
| 2,522,433 | Dahlberg, Jr. | Sept. 12, 1950 |
| 2,530,971 | Kean | Nov. 21, 1950 |
| 2,596,024 | Goble et al. | May 6, 1952 |